United States Patent [19]

Zemelman et al.

[11] 4,404,807
[45] Sep. 20, 1983

[54] GASIFIED ICE PROCESS AND PRODUCT

[75] Inventors: Valery B. Zemelman, Wilton, Conn.; Fredric Kleiner, Valley Cottage, N.Y.

[73] Assignee: General Foods Corporation, White Plains, N.Y.

[21] Appl. No.: 334,846

[22] Filed: Dec. 28, 1981

[51] Int. Cl.³ .............................................. F25C 1/00
[52] U.S. Cl. ............................................ 62/1; 62/48; 62/69
[58] Field of Search ...................... 62/1, 48, 69, 70, 66

[56] References Cited

U.S. PATENT DOCUMENTS

| | | | |
|---|---|---|---|
| 2,575,509 | 11/1951 | Bayston | 62/1 X |
| 2,975,603 | 3/1961 | Barnes et al. | 62/1 |
| 3,086,370 | 4/1963 | Barnes et al. | 62/1 |
| 3,217,503 | 11/1965 | Mitchell et al. | 62/48 |
| 3,220,204 | 11/1965 | Adler et al. | 62/70 |
| 3,255,600 | 6/1965 | Mitchell et al. | 62/69 |
| 3,333,969 | 8/1967 | Mitchell et al. | 99/192 |
| 4,333,315 | 6/1982 | Zemelman et al. | 62/1 |
| 4,347,707 | 9/1982 | Zemelman et al. | 62/1 X |

OTHER PUBLICATIONS

H. W. Herreilers Het Systeem $CO_2$–$H_2O$. Ph.D. Thesis, University of Amsterdam, 1936. (English translation of title page and Chapter VIII, "Summary" and p. 75.).

Primary Examiner—William E. Tapolcai
Attorney, Agent, or Firm—Joyce P. Hill; Thoas R. Savoe; Daniel J. Donovan

[57] ABSTRACT

According to the present invention, equilibrium between the applied gas and an aqueous liquid is achieved at conditions suitable for the preparation of a chemical complex of gas hydrate, and the pressure is then rapidly reduced to effect a concurrent temperature reduction and the formation of nuclei of water ice distributed throughout the aqueous liquid. Reaction conditions are then reestablished to initiate and complete the formation of gas hydrate which is then frozen within a matrix of the aqueous liquid. The resulting product is characterized by a high gas content, prolonged storage stability suitable for commercial distribution in its frozen state, and a vigorous, uniform effervescence when placed in water.

8 Claims, 1 Drawing Figure

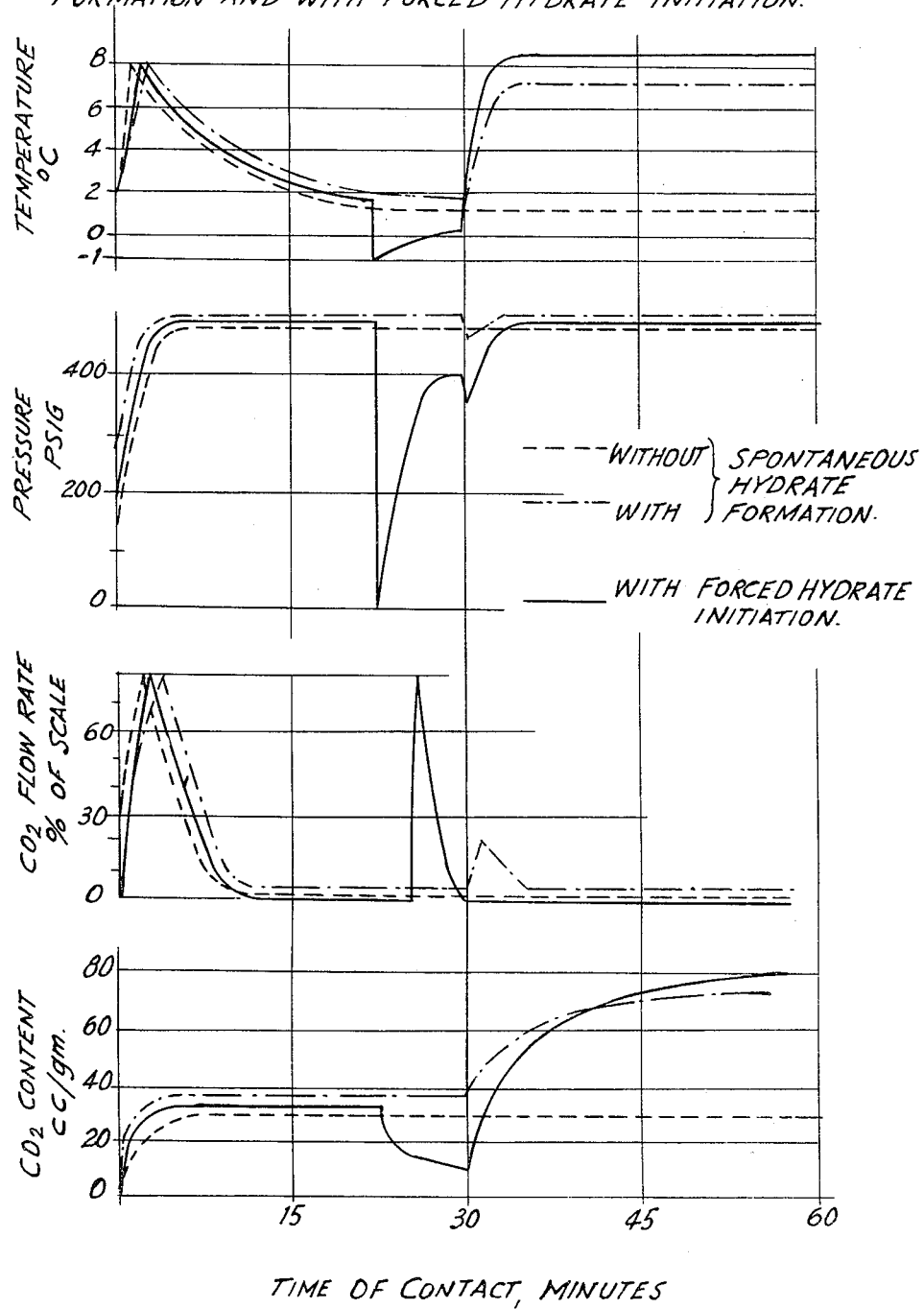

GASIFIED ICE PROCESS AND PRODUCT

DESCRIPTION

TECHNICAL FIELD

The present invention relates to the preparation of gasified ice products; and, particularly, to improvements which permit more precise process control and enable the production of more uniform products.

Gasified ice products are known which, due to the binding of gas within a chemical complex known as a gas hydrate, have enabled delivery of high volumes of gas from relatively small volumes of ice. These products have shown potential for storage and transport of gases of many types. Typically, the gas will be carbon dioxide and the product will be employed to carbonate an aqueous liquid in the simplified home preparation of carbonated beverages.

For the greatest economy and convenience, it is desirable to incorporate high levels of gas. Unfortunately, the preparation of products having desirably high gas contents at practical rates has been less efficient and less predictable than desired. And, the products typically released gas unevenly.

In its simplest form, the process for preparing gasified ice products has comprised contacting aqueous liquid with a suitable gas under high pressure for a sufficient period of time to form a desired level of gas hydrate, and then cooling to freeze aqueous liquid and entrap the gas hydrate. During the period of contact, it is believed that the hydrate forms around nuclei of solid particles from previously-formed hydrate. Due to many variations which routinely occur as a result of ambient temperature fluctuations, random mechanical disturbances such as vibration, and other causes, the required nuclei for continued hydrate formation which are formed spontaneously, are unfortunately formed at varying times throughout the reaction vessel. This creates an undesirable degree of unpredictability in terms of process control and typically results in a final product which has a non-uniform concentration of gas hydrate distributed throughout. Moreover, where attempts have been made to initiate the reaction by adding seed crystals, process control is improved somewhat, but it still remains difficult to achieve an end product having desirably uniform gas content.

BACKGROUND ART

Barnes et al in U.S. Pat. Nos. 2,975,603; 3,086,370; and 3,217,503 disclose processes for preparing ice products containing from about 25 to about 120 milliliters of carbon dioxide, or other suitable conditionally-stable-hydrate-forming gas, per gram of frozen product. According to one aspect of these related disclosures, carbonated ice was prepared by subjecting aqueous liquid to a carbon dioxide pressure of at least about 200 psig and preferably less than 600 psig; maintaining the aqueous liquid and the carbon dioxide in contact for a time sufficient to permit absorption in the liquid of carbon dioxide in bound form; and freezing the reaction mixture which contained carbon dioxide hydrate crystals suspended within unreacted aqueous liquid. The products resulting from the processes of these patents were less uniform than desired, and the processes themselves were difficult to control to achieve consistent results.

Adler et al, in U.S. Pat. No. 3,220,204, state that while the prior art procedures of Barnes et al produced products which would retain a high level of carbonation during frozen storage, the products had a tendency to explode or pop during dissolution of the product to release the gas. Adler et al indicate that when the Barnes et al carbonated ice products were added to water or milk, they would frequently explode in the glass. To correct this, Adler et al subjected a thin film of water to carbon dioxide gas at a pressure and temperature above the eutectic point of the water, the temperature being low enough to form a hydrate. They stated that, as a practical matter, in order to operate under controllable conditions, hydrate should be produced at a pressure above 200 psig and at a temperature above 0° C., in order to maximize hydrate formation while minimizing collateral formation of water ice. After suitable hydrate formation, the reaction mixture containing water and hydrate crystals was frozen at a temperature below −3° C. This process did improve process control, but gas hydrate levels were not as high as desired and the products typically exhibited great variations in gas hydrate concentration.

In U.S. Pat. No. 3,255,600 to Mitchell et al, there is disclosed a process for forming carbonated ice wherein liquid carbon dioxide and liquid water or water ice are mixed under controlled conditions. The patentees indicate that they discovered that liquid carbon dioxide results in a more rapid formation of the product while permitting more accurate control of the operating conditions. It has been our experience, however, that the use of liquid carbon dioxide requires the use of great quantities of energy and produces a product which loses significant gas content before it can be commercially distributed; and it has the popping and cracking problems associated with the earlier prior art.

Throughout this evolution of gasified ice products involving reactions above the freezing point of water, Mitchell et al disclose in U.S. Pat. No. 3,333,969, that the problem of uneven release of the gas had persisted. Mitchell et al focused on a method for subdividing carbonated ice into discrete particles while maintaining the temperature of the ice below 0° C., and then compacting the discrete particles to form them into an adhered mass or briquette to eliminate the explosive release of carbon dioxide during carbonation. This process actually resulted in a decrease in final gas content.

It is apparent from the foregoing discussion of the prior art that the problems associated with achieving gasified ice products having high gas contents, good storage stability, and uniform gas release have been significant concerns. These problems were further compounded by the unpredictability inherent in these processes which relied upon the spontaneous initiation of nucleation within the aqueous liquid. Therefore, there remains a present need for improvements in the preparation of gasified ice products which will permit more precise process control and enable the production of more uniform gasified ice products.

DISCLOSURE OF INVENTION

In accordance with the present invention, we provide an improved process for preparing gasified ice products and the improved products resulting from that process. The products are characterized by high gas contents, prolonged storage stability suitable for commercial distribution in the frozen state, and a vigorous, uniform effervescence when placed in water. The process according to the present invention enhances process control by forcing initiation of nuclei about which the gas hydrate can form. And, because the nuclei are formed so uniformly throughout the reaction mixture, the resulting product is also more uniform in gas content.

In its broad aspects, the present invention provides an improvement in the process for preparing gasified ice by contacting an aqueous liquid with a conditionally-stable-hydrate-forming gas under conditions of temperature, applied gas pressure and time effective to form a gas hydrate, followed by reducing the temperature of the aqueous liquid below its freezing point to entrap the gas hydrate in a matrix of frozen aqueous liquid, wherein the improvement is characterized in that: (a) the aqueous liquid is initially contacted with said gas under conditions of temperature and applied gas pressure capable of forming the gas hydrate; (b) the initial contact is maintained under applied pressure of said gas, for a time effective to substantially equilibrate the total pressure in the system; (c) the applied pressure of said gas is rapidly reduced to a degree effective to reduce the temperature of the aqueous liquid sufficiently to initiate formation of nuclei of water ice throughout said aqueous liquid; (d) the applied pressure of said gas is increased to a level effective to initiate the formation of gas hydrate; (e) the applied pressure of said gas and the temperature of said aqueous liquid are then maintained at levels and for a time effective to form additional gas hydrate about said nuclei of water ice; and (f) the temperature of said aqueous liquid is reduced below its freezing point to entrap the gas hydrate in a matrix of frozen aqueous liquid.

Among the gases which are capable of forming conditionally-stable hydrates are those which form hydrates which appear to be characterized by a loose bond between the gas and water under controlled conditions of temperature and high pressure. All of the suitable gases exist in the gaseous state at atmospheric pressure at temperatures above 0° C., as well as all of the conditions encountered during contact. For example, carbon dioxide gas combines with water to form a gas hydrate containing from about 5.75 to about 6 or more moles of water per mole of gas. The hydrates are further characterized by their ability to be stored in essentially stable condition at temperatures below about 0° C. and then be decomposed by melting in an aqueous liquid.

Specifically identified as gases capable of forming conditionally-stable hydrates are various oxides of non-metals, typically nitrous oxide; sulfur-containing gases, including hydrogen sulfide; chlorine-containing gases, including chlorine and methylene chloride; carbon dioxide and various inert gases such as argon and krypton. Preferably, the gas will be selected from the group consisting of these, and most preferably will comprise carbon dioxide, nitrous oxide, or chlorine, due to their adaptability to the process and the widespread utilities. While not intending to be bound to the specific example of carbon dioxide, much of the detail of the following disclosure of the invention will focus on this as exemplary, due to its ready adaptability to use in preparing carbonated beverages for which there appears to be an immediate commercial opportunity.

In carrying out the process of this invention, the aqueous liquid will preferably be essentially pure water or a saturated solution thereof with the particular gas. Although some advantages in terms of reproducibility of precise conditions and stability of the final product may be obtained by using distilled or deionized water, the process of the present invention is not limited to these. The person of ordinary skill in the art may employ various types of solutions, and in the case of food products such as beverages, various materials including sugar, color, flavor, acidulents, and the like, knowing that they may decrease ease of process control or affect the stability of the final product. Thus, the terms water, ice and aqueous liquid will be hereinafter employed to include the appropriate form of water or water ice containing added materials such as those mentioned, as well as water or water ice per se.

BRIEF DESCRIPTION OF THE DRAWING

The invention will be better understood, and its advantages will become more apparent from the following detailed description, especially when read in light of the attached drawing wherein:

The FIGURE is a graph showing the temperature, pressure, carbon dioxide flow rate and carbon dioxide content versus time of contact for conditions yielding no spontaneous hydrate formation, spontaneous hydrate formation and hydrate formation with forced initiation of nucleation according to the invention.

BEST MODE FOR CARRYING OUT THE INVENTION

The present invention provides a process for preparing a gasified ice product which is characterized by a uniformly-distributed high gas content, a vigorous, uniform evolution of gas when placed in aqueous liquid, and a quiet non-popping, non-explosive character when exposed to ambient air. High gas contents can be achieved in practical, predictable periods of time with good efficiency.

The invention takes advantage of the discovery that an improved product results from forcing the initiation of water ice nuclei formation after the reaction mixture has been brought to conditions of temperature and pressure capable of forming a gas hydrate. The process for forcing the initiation of nuclei formation involves rapidly reducing the pressure of the reaction mixture and thereby causing a rapid reduction in the temperature of the reaction mixture so that a myriad of ice crystals form throughout the reaction mixture. Because the forced formation of water ice nuclei in this manner results in a highly uniform distribution of nuclei throughout the reaction mixture, re-pressurization and reestablishment of reaction conditions result in a more uniform growth and concentration of gas hydrate within the final product than can be achieved without forced formation of nuclei.

The following description will discuss a preferred process wherein a carbonated ice product suitable for use in beverage preparation is prepared by forming carbon dioxide hydrate using the nuclei of solid water ice as seed crystals. The distribution of carbon dioxide hydrate is made more uniform through the improvement of the present invention.

In the initial processing stage, carbon dioxide, the preferred conditionally-stable-hydrate-forming gas, is contacted with an aqueous liquid under conditions of temperature and pressure capable of forming a stable gas hydrate. Typically, the reaction will be conducted within a pressurized reactor and the carbon dioxide will be fed into it and into contact with the aqueous liquid maintained therein until the aqueous liquid becomes substantially saturated with carbon dioxide.

The pressure during the initial period of contact according to the present invention is preferably high to obtain a desirably high degree of gas hydrate formation.

Typically, pressures of at least 250 psig will be employed, and preferably the pressure will be within the range of from about 350 psig to about 650 psig. Preferred pressure levels will be within the range of from about 450 psig to about 600 psig.

The temperature will be selected, depending upon the particular pressure employed to be above the freezing point of water, above the liquefication point of carbon dioxide, and on or below the hydrate formation line for the reaction system. Within this area on the phase diagram for carbon dioxide-water-$CO_2$ hydrate, as shown for example in the Ph.D. thesis of H. W. Herreilers, University of Amsterdam (1936), at page 75, conditions are suitable for formation of carbon dioxide hydrate.

The FIGURE shows the effect of reaction temperature, applied gas pressure, gas flow rate and gas content of the reaction medium for one exemplary comparison of known processes with the present forced nuclei initiation process in the formation of carbon dioxide hydrate. The solid lines on each of the graphs trace the progress of the reaction according to the present invention which forces the initiation of water ice nuclei. The dashed lines follow the progress of the reaction where hydrate formation is not forced and does not spontaneously occur. The dot and dash lines trace the progress of a reaction wherein hydrate initiation is not forced according to the present invention but occurs spontaneously. It can be seen from the graph that the carbon dioxide content increases at a more rapid rate where the hydrate formation follows the forced initiation of water ice nuclei as described herein. While not wanting to be bound to any particular theory, it is believed that this is because the water ice nuclei are formed in greater numbers and more uniformly throughout the reaction medium when forced according to the invention, and therefore rapidly take up carbon dioxide under hydrate formation conditions.

It can be seen by reference to the FIGURE that as the carbon dioxide gas is initially applied, an initial period of time is required to reach equilibrium within the reaction vessel. During this time, the aqueous liquid takes up the carbon dioxide into solution. The initial contact is maintained until the increase in $CO_2$ content of the product becomes negligible.

After equilibrium is established within the reaction vessel, the applied pressure of the gas is rapidly reduced to a degree effective to reduce the temperature of the aqueous liquid sufficiently to initiate formation of nuclei of water ice throughout said aqueous liquid. Typically, this entails venting the reactor to reduce the applied gas pressure to substantially atmospheric. This sharp reduction in pressure can be seen for example in the attached FIGURE. The reduction in pressure causes a drop in temperature of the aqueous liquid and the formation of nuclei of water ice throughout the liquid.

The rapid reduction of pressure by venting is preferably immediately followed by an increase in the pressure, without mixing, to minimize melting of water ice nuclei, to a level effective for the formation of carbon dioxide hydrate. The reaction conditions for the formation of carbon dioxide hydrate can be essentially the same as those established during the initial contact period, or they can be lower or higher where desired. It is preferred in all cases, however, that the conditions be within the stable hydrate formation area on the Herreilers' phase diagram as described.

To achieve practically high reaction rates, it is essential to maintain good gas-liquid contact during the period of reaction. This can be achieved in a pressurized reaction vessel by vigorously agitating the aqueous liquid during the period of contact to disperse the bubbles of gas therein, thereby effecting continuous, efficient mass transfer between the gas and liquid phases. To achieve a high degree of gas-liquid contact, with bubbles of gas continuously maintained at a suitably small size and dispersed throughout the liquid, a high degree of mixing shear is ordinarily necessary. At the start of the reaction, the $CO_2$-saturated, aqueous solution is very fluid and relatively nonviscous. During later stages of the reaction, the suspension of hydrate within the aqueous liquid becomes relatively viscous due to its slush-like character. The reaction temperature remains substantially constant during hydrate formation.

Various means can be employed according to the present invention to achieve the desired high degree of agitation and liquid-gas contact. Among these are mechanical stirrers, mechanical vibrators, gas sparging, liquid spraying and the like. The exact design of the reactor and the mixing device will of course depend upon a number of factors including the scale of the processing equipment.

The contact between the gas and the aqueous liquid are maintained for a period of time effective to form gas hydrate suspended in the aqueous liquid. The exact time required for hydrate formation at a sufficiently practical level for suitable gasified ice products depends upon a number of factors including the pressure as described above, the concentration of solids within the aqueous liquid, the efficiency of heat withdrawal from the aqueous liquid, and the efficiency of contact between the gas and the aqueous liquid. Thus, there is no universal set of preferred contact times. Experience will show, however, that a particular reaction can be standardizesd to obtain a prediction of contact time for that specific reaction.

Because one of the objects of the invention is to prepare gasified ice products having high gas contents, the contact between the gas and the aqueous liquid is preferably maintained for a period of time effective to bring the hydrate-forming reaction to within at least 75% and preferably about 90% of completion. When the temperature of the aqueous liquid begins to fall after maintaining a steady value during reaction due to the evolution and removal of heat, the reaction is considered to be satisfactorily completed. At this point, the evolution of the latent heat of hydrate formation will cease, and the heat exchange contact with the aqueous liquid will cause the temperature of the liquid to drop.

In the preferred embodiment wherein carbon dioxide is contacted with an aqueous liquid to form carbonated ice, the contact will preferably be maintained for a period of time effective to form sufficient hydrate to produce a product containing greater than 50, preferably greater than 60, and most preferably being at least 85 milliliters of carbon dioxide per gram of product. While it is theoretically possible to achieve higher carbon dioxide contents, on the order of up to about 118 to 120 milliliters per gram of product, and these products are intended to be included within the scope of the invention, the most practical products will contain sufficient nonhydrated, $CO_2$-saturated water to form a continuous frozen coating around dispersed hydrate complexes and thereby protect these hydrate complexes from decomposition during storage.

After the desired degree of hydrate formation is achieved, the hydrate must be recovered as a dispersed phase within a continuous matrix of carbonated water. This can be achieved by reducing the temperature of the aqueous liquid in the reactor to effect freezing therein, or it can be achieved in a separate freezing chamber after transfer of the aqueous liquid thereto.

The specific configuration of the freezing chambers and the transfer lines does not form a part of the present invention but can be of any suitable design capable of withstanding the temperatures and pressures required for this reaction.

The freezing chamber will be maintained at a pressure sufficient to prevent loss of hydrate and at a temperature sufficient to freeze the suspension completely. In order to prevent decomposition of hydrate or condensation of $CO_2$ gas during the freezing or reaction process, it is necessary to reduce temperature and pressure in the freezing chamber or in the reactor vessel in a coordinated manner to remain within the temperature and pressure regions of stable hydrate according to the aforementioned $CO_2$-water-hydrate phase diagram described by H. W. Herreilers. Thus, for example, for a reaction pressure of 500 psig, which corresponds to a reaction temperature of 8° C., the slurry is first cooled to 3° C. at constant pressure; decompressed to 320 psig at constant temperature of 3° C., cooled to 1° C. at constant pressure, decompressed to 250 psig at constant temperature and, finally, cooled to $-12°$ C. at constant pressure during which time the entire slurry freezes completely.

The carbonated ice prepared in the above manner can be packaged in a suitable container such as a can or styrofoam cup. When packaged in containers of this type, the carbonated ice will provide a high degree of storage stability at ambient pressure and at temperatures within the range of from about $-5°$ to $-20°$ C. for time periods of in excess of 6, and preferably in excess of 8 months.

Along with the carbonated ice, in the same package or in a separate adjoining package, there may be provided a composition for preparing a soft drink such as the kind which comprises a color, flavor, and edible acidulent, and a sweetener, all of these ingredients being present in amounts effective to provide the desired taste and eye appeal.

The following example is presented for the purpose of further illustrating and explaining the present invention and is not to be taken as limiting in any regard. Unless otherwise indicated, all parts and percentages are by weight.

EXAMPLE

At a temperature of about 3° C. (36° F.), carbon dioxide gas is supplied to water at a gas pressure of 350 psig until a zero pressure differential between the gas and water is achieved and complete solution of carbon dioxide gas in water is accomplished. (See the solid line in the attached FIGURE.) The pressure is then relieved, causing a temperature drop of the solution down to $-2°$ C. (30° F.) and the formation of water ice nuclei. Next, the vessel is re-pressurized, without mixing, to a desired pressure (in the range from 250–520 psig). The absence of mixing minimizes the rate of reaction thereby preventing the nuclei from melting from heat of hydrate formation. When the desired pressure is reached, mixing is resumed. A quick temperature rise is observed due to the initiation of hydrate formation. This procedure minimizes hydrate formation time and forms hydrate throughout the entire reaction volume. Also, the process can be better controlled, resulting in increased $CO_2$ uniformity in the carbonated ice product.

The above description is for the purpose of teaching the person skilled in the art how to practice the present invention. This description is not intended to detail all of the obvious modifications and variations of the invention which will become apparent to the skilled worker upon reading. However, it is intended to include all such obvious modifications and variations within the scope of the invention which is defined by the following claims.

We claim:

1. An improved process for preparing a gasified ice characterized by a high gas content, prolonged storage stability suitable for commercial distribution in its frozen state, and a vigorous, uniform effervescence when placed in water, by contacting an aqueous liquid with a conditionally-stable-hydrate-forming gas under conditions of temperature, applied gas pressure and time effective to form a gas hydrate, followed by reducing the temperature of the aqueous liquid below its freezing point to entrap the gas hydrate in a matrix of frozen aqueous liquid, wherein the improvement is characterized in that:
   (a) the aqueous liquid is initially contacted with said gas under conditions of temperature and applied gas pressure capable of forming the gas hydrate;
   (b) the initial contact is maintained under applied pressure of said gas for a time effective to substantially equilibrate the total pressure in the system;
   (c) the applied pressure of said gas is rapidly reduced to a degree effective to reduce the temperature of the aqueous liquid sufficiently to initiate formation of nuclei of water ice throughout said aqueous liquid;
   (d) the applied pressure of said gas is increased to a level effective to initiate the formation of gas hydrate;
   (e) the applied pressure of said gas and the temperature of said aqueous liquid are then maintained at levels and for a time effective to form gas hydrate about said nuclei of water ice; and
   (f) the temperature of said aqueous liquid is reduced below its freezing point to entrap the gas hydrate in a matrix of frozen aqueous liquid.

2. A process according to claim 1 wherein the gas is selected from the group consisting of carbon dioxide, hydrogen sulfide, chlorine, methylene chloride, argon, krypton and nitrous oxide.

3. A process according to claim 2 wherein the gas is carbon dioxide.

4. A process according to claim 1 wherein the applied gas pressure is maintained above about 250 psig during the initial contact.

5. A process according to claim 4 wherein the applied gas pressure is maintained at a value within the range of from about 350 to about 650 psig during the initial contact.

6. A process according to claim 1 wherein the applied gas pressure is increased to a value above about 250 psig after formation of nuclei of water ice.

7. A process according to either of claims 5 or 6 wherein the applied gas pressure is increased to a value within the range of from about 350 to about 650 psig after the formation of nuclei of water ice.

8. A product produced according to the process of either of claims 1 or 3.

* * * * *